(12) United States Patent
Fujita et al.

(10) Patent No.: US 7,966,715 B2
(45) Date of Patent: Jun. 28, 2011

(54) METHOD OF MANUFACTURING CARBON ELECTRODE

(75) Inventors: Takeshi Fujita, Akita (JP); Masaki Morikawa, Akita (JP)

(73) Assignee: Japan Super Quartz Corporation, Akita-Shi (JP)

( * ) Notice: Subject to any disclaimer, the term of this patent is extended or adjusted under 35 U.S.C. 154(b) by 0 days.

(21) Appl. No.: 12/564,207

(22) Filed: Sep. 22, 2009

(65) Prior Publication Data

US 2010/0077611 A1 Apr. 1, 2010

(30) Foreign Application Priority Data

Sep. 26, 2008 (JP) ................. P2008-248087

(51) Int. Cl.
*H01S 4/00* (2006.01)
(52) U.S. Cl. ............. 29/592.1; 29/825; 29/874; 29/875; 373/88; 373/89
(58) Field of Classification Search .................. 29/592.1, 29/825, 874, 875; 373/88, 89
See application file for complete search history.

(56) References Cited

U.S. PATENT DOCUMENTS

| | | | | |
|---|---|---|---|---|
| 2,960,726 A | * | 11/1960 | Sheer et al. ................. | 264/29.7 |
| 4,536,359 A | * | 8/1985 | Tanaka ......................... | 264/102 |
| 5,978,410 A | | 11/1999 | Johansen et al. | |
| 6,363,098 B1 | * | 3/2002 | Hagihara et al. ............. | 373/88 |
| 6,553,787 B1 | | 4/2003 | Akiho et al. | |
| 7,160,297 B2 | * | 1/2007 | Nesbitt ........................ | 606/45 |
| 7,288,091 B2 | * | 10/2007 | Nesbitt ........................ | 606/45 |
| 2005/0000404 A1 | | 1/2005 | Kishi et al. | |

FOREIGN PATENT DOCUMENTS

| | | |
|---|---|---|
| CN | 1177434 | 3/1998 |
| EP | 0245764 | 11/1987 |
| JP | 2001-097775 | 4/2001 |
| JP | 2002-068841 | 3/2002 |
| JP | 2002-439110 * | 3/2002 |
| JP | 2003-335532 | 11/2003 |
| JP | 3647688 | 2/2005 |
| JP | 2007/273206 | 10/2007 |

OTHER PUBLICATIONS

China Office action, mail date is Dec. 6, 2010.
English language Abstract of JP 2001-089171, corresponding to JP 3647688, Feb. 18, 2005.
Extended European Search Report dated Nov. 19, 2009 that issued with respect to patent family member European Patent Application No. 09171091.3.

* cited by examiner

*Primary Examiner* — C. J Arbes
(74) *Attorney, Agent, or Firm* — Greenblum & Bernstein, P.L.C.

(57) ABSTRACT

A method of manufacturing a carbon electrode for melting an object to be melted by arc discharge, includes: a rubbing step of rubbing the surface of the carbon electrode before power is supplied with a rubbing material of the same type as the object to be melted.

4 Claims, 6 Drawing Sheets

140
METHOD OF MANUFACTURING CARBON ELECTRODE

BACKGROUND OF THE INVENTION

1. Field of the Invention

The present invention relates to a method of manufacturing a carbon electrode and a method of manufacturing a fused silica crucible, and more particularly, to a technique able to be applied to heating and melting vitreous silica powder by arc discharge for vitrification.

Priority is claimed on Japanese Patent Application No. 2008-248087, filed on Sep. 26, 2008, the content of which is incorporated herein by reference.

2. Description of the Related Art

A fused silica crucible used for pulling single-crystal silicon is manufactured mainly by arc melting. Briefly, this method is a method of manufacturing a fused silica crucible by accumulating a predetermined thickness of vitreous silica powder on an inner surface of a mold made of carbon so as to form a vitreous silica powder compact that is a vitreous silica-deposited layer, providing carbon electrodes above the vitreous silica powder compact, and heating the vitreous silica-deposited layer by the arc discharge for vitrification.

Japanese Patent No. 03647688 discloses a technique related to arc melting in a fused silica crucible manufacturing process by using arc melting, and JP-A-2002-68841 and JP-A-2001-097775 disclose techniques related to electrodes used for arc discharge. In addition, JP-A-2003-335532 discloses a description related to an inter-electrode distance for arc discharge.

In addition, due to resent demand for higher efficiency of a device operation, the diameter of a manufactured wafer has increased to over 300 mm, and for this, there is a requirement for a fused silica crucible used for pulling single crystals with a large diameter. In addition, due to demand for a reduction in size of a device or the like, there is a strong demand for improvements in crucible properties such as an internal state of a fused silica crucible, which may directly affect the properties of single crystals under pulling.

SUMMARY OF THE INVENTION

However, there is a possibility that impurities, such as metal, stick to the surface of a formed electrode, and there is a possibility that portions of the electrode consumed during arc discharge may be incorporated into the vitreous silica powder compact under vitrification due to an effect of a generated arc plasma flow or the like. When such a crucible is used for pulling a semiconductor single crystal, the incorporated impurities are melted in a silicon raw material melt during pulling and incorporated into the single crystal, such that there is a problem in that the properties of the pulled single crystal may be undesirable.

In addition, in the case where the contaminants such as metal are incorporated into the crucible, crystallization occurs from the contaminants, and the generated cristobalite small pieces exfoliate in the semiconductor melt and are incorporated into the single crystal, thereby causing dislocation.

In addition, due to a resent increase in diameter of single crystal and crucibles, the time needed to manufacture a single crucible has increased, and the amount of power supplied has increased, so that the amount of power consumed has also increased. As a result, the amount of contaminants incorporated into the crucible from the contaminated electrode increases, such that the above-mentioned problems have become more apparent.

The present invention is designed to solve the above-mentioned problems. Objects of the invention are:

(1) to prevent electrode contaminants from being incorporated into a crucible, (2) to reduce the adverse effect on the pulling of a single crystal using a crucible.

(3) to provide a fused silica crucible which has good properties for pulling a single crystal, and (4) to achieve a reduction in electrode contaminants at low cost.

According to a first aspect of the present invention, there is provided a method of manufacturing a carbon electrode for melting an object to be melted by arc discharge, including: a rubbing step of rubbing the surface of the carbon electrode before power is supplied with a rubbing material of the same type as the object to be melted.

In the method of manufacturing a carbon electrode of the present invention, the surface of the carbon electrode is so-called "cleaned together" with the rubbing material of the same type as the object to be melted. Therefore, it is possible to clean and the surface of the electrode without new impurities sticking to the surface of the electrode and reduce the impurity concentration. Accordingly, it is possible to provide an electrode capable of performing arc melting while preventing impurities stuck to the surface of the electrode during arc melting from being incorporated into the object to be melted.

In addition, cleaning the surface of the carbon electrode with a cleaning liquid can be considered. However, due to the structure of the carbon electrode, the cleaning liquid permeates into the electrode and the impurities are impregnated into the electrode. Therefore, this device is not suitable.

According to the present invention, it is more preferable that the rubbing step is performed after a grinding step of shaping the front end of the carbon electrode.

In this case, impurities, such as metal, sticking to the surface of the electrode are removed by the grinding step so as to maintain the cleanliness of the surface of the electrode, and the amount of impurities generated from the electrode during arc melting are reduced, thereby preventing the impurities from being incorporated into the object to be melted during arc melting.

Particularly, in the case of a plurality of carbon electrodes where bar-shaped portions are connected, the front end shapes need to be shaped according to arc discharge. An example will be described as follows.

Specifically, as illustrated in FIG. 7, a carbon electrode 13E is constituted by an electrode 13E1 having a bar shape with a front end portion 13a for performing arc discharge and electrodes 13E2 and 13E2 connected to the electrode 13E1. One end (on the right in the figure) of the electrode 13E1 that serves as a base end side of the electrode 13E is provided with a female thread 13Ea, and the other end (one the left in the FIG. 13a thereof is provided with a male thread 13Eb. Similarly, both ends of the electrode 13E2 are provided with a female thread 13Ea and a male thread 13Eb, and the electrodes 13E1 and 13E2 are attached to each other by connecting the threads 13Ea and 13Eb.

In the case of this electrode configuration, for example, a grinding step is needed for grinding an end portion having the male thread 13Eb of the electrode 13E2 into the front end portion 13a for performing arc discharge.

After the grinding step, by performing the rubbing step described above on the electrode surface, it is possible to remove contaminants, such as metal, sticking to the electrode surface by the grinding step.

In addition, the grinding step is not limited by the purpose shaping the electrode surface that had already once been subject to arc discharge. The grinding step includes a step that has a possibility of contamination due to a grinding device, such as metal, which comes in contact with the electrode.

According to the present invention, the rubbing material may be vitreous silica powder.

In this case, the object to be melted may be vitreous silica powder or vitreous silica, and accordingly, it can be "cleaned together" by the same type of vitreous silica powder as the vitreous silica (silica) that is the object to be melted, so that it is easy to clean the surface of the electrode in a state where sticking of other new impurities is prevented.

In addition, according to the present invention, the levels of impurities of the vitreous silica powder may be set to be in the ranges of 0.001 to 1.0 ppm of Fe, 0.001 to 1.3 ppm of Na, 0.001 to 1.0 ppm of K, 0.001 to 1.0 ppm of Li, 0.001 to 0.05 ppm of Cu, and 0.001 to 1.0 ppm of Ca, or in ranges at lower levels than these ranges.

In this case, sticking of new impurities from the vitreous silica powder to the electrode is prevented in the rubbing step, so that it is possible to realize a desired cleanliness on the surface of the electrode. Accordingly, it is possible to provide a carbon electrode able to be applied to a process that requires a high degree of cleanliness for a fused silica crucible that is an object (product) to be melted, such as, the manufacturing process of a fused silica crucible.

Particularly, it is possible to clean contaminants which are contained in a semiconductor single crystal at high ratios, such as, Fe and Cu, to such a level that they do not affect the inside of the electrode, do not cause dislocation upon pulling the semiconductor single crystal, and do not have an effect on the life-time of the crystal.

In addition, with regard to Na, K, Li, and Ca, advantages in reducing crystallization of fused silica and preventing a reduction in single-crystal yield can be exhibited.

In addition, the average particle size $D_{50}$ of the vitreous silica powder may be in the range of $\phi 100$ to 250 μm.

In this case, it is possible provide an electrode which has a size necessary for removing impurities, such as Fe, sticking to the surface of the electrode by rubbing, and does not cause an interruption of the generation of arc plasma during arc discharge, which is caused by vitreous silica powder incorporated into the electrode. In addition, by setting the average particle size of the vitreous silica powder to be in the above-mentioned range, the electrode surface can be suitably roughened. Accordingly, the surface area thereof can be increased, and discharge becomes easy.

Here, the average particle size $D_{50}$ device a particle size of 50% of the integrated value in a particle size distribution of the raw powder.

According to the present invention, in the rubbing step, rubbing may be performed, in a state where the front end side of the carbon electrode is inserted into a storage tank storing vitreous silica powder as the rubbing material, by rotating and/or reciprocating in an axial direction the storage tank and the carbon electrode relative to each other.

In this case, it is possible to realize the above-mentioned electrode surface cleanliness with a simple configuration at a low cost.

In addition, since the electrode surface is suitably roughened, the surface area is increased, and discharge becomes easy.

In addition, in the rubbing step, sandblasting may be performed on the front end side of the carbon electrode by using vitreous silica powder as the rubbing material.

In this case, it is possible to selectively clean portions contaminated locally or intensively on the surface of the electrode. In addition, for example, as compared with a technique of storing vitreous silica powder, it is possible to reliably enable a state where vitreous silica powder for rubbing the electrode is not contaminated.

In addition, in the rubbing step, when the front end side of the carbon electrode is rubbed, the levels of impurities on the surface of a holding device for holding the base end side of the electrode may be maintained in the ranges of 0.001 to 1.0 ppm of Fe, 0.001 to 1.3 ppm of Na, 0.001 to 1.0 ppm of K, 0.001 to 1.0 ppm of Li, 0.001 to 0.05 ppm of Cu, and 0.001 to 1.0 ppm of Ca, or in the ranges at lower levels than these ranges.

In this case, in the electrode consumed by arc discharge, the impurity concentration is defined as described above for the base end side but not for the front end portion. Therefore, it is possible to realize a desired cleanliness on the surface of the electrode by preventing sticking of new impurities to the electrode during the rubbing step performed on the base end side. Accordingly, it is possible to provide a carbon electrode with a surface state over the entire length able to be applied to a process that requires a high degree of cleanliness for a fused silica crucible that is an object (product) to be melted, such as, the manufacturing process of a fused silica crucible.

Here, it is possible to clean contaminants which are contained in a semiconductor single crystal under pulling at high ratios, such as, Fe and Cu, to such a level that they do not affect the inside of the electrode, do not cause dislocation upon pulling the semiconductor single crystal, and do not have an effect on a life-time of the crystal.

Particularly, in the manufacturing process of a fused silica crucible, during arc discharge for manufacturing a single crucible, impurities from a portion of the electrode consumed in the final step of the arc discharge are incorporated into the outermost surface on the inner surface of the crucible, and during pulling, the inner surface of the crucible is melted toward the inside in a thickness direction from the outermost surface. Therefore, when impurities exist on the outermost surface of the crucible, they are melted in a semiconductor melting in an initial pulling step, and there is a possibility that they are continuously incorporated into a single crystal through the subsequent pulling step. Accordingly, the impurity level of the portion of the electrode consumed in the final step of the arc discharge affects the single crystal properties the most when the portion is used during pulling. Therefore, by reducing the contaminant level on the base end side so that it is lower than that of the tip end portion as described above, it is possible to further prevent degradation of single crystal properties.

In addition, with regard to Na, K, Li, and Ca, advantages in reducing crystallization of fused silica and preventing a reduction in single-crystal yield can be exhibited.

According to second aspect of the present invention, there is provided a manufacturing method of a fused silica crucible, comprising: a step of manufacturing a plurality of carbon electrodes by the manufacturing method described above: a vitreous silica powder mold forming step by forming a vitreous silica powder into a crucible mold; and a discharge forming step between a plurality of carbon electrodes by supplying power.

According to third aspect of the present invention, there is provided a method of manufacturing a fused silica crucible used for melting a vitreous silica powder compact that is the object to be melted by arc melting using the carbon electrode manufactured by the manufacturing method described above, wherein the rubbing material is the same type of vitreous silica powder as the raw material for manufacturing a fused silica crucible.

In this case, the vitreous silica (silica) that is the object to be melted is "cleaned together" by the same type of vitreous silica powder, and the impurity concentration can be reduced without new impurities sticking to the surface of the electrode, thereby preventing incorporation of impurities sticking to the surface of the electrode during arc melting into the fused silica crucible. Accordingly, it is possible to manufacture the fused silica crucible that has a small effect from impurities under pulling a single crystal containing a small amount of impurities.

By using this electrode for the manufacturing process of a fused silica crucible, even in the case where there is an increase in processing time and the amount of electrode consumed due to an increase in diameter, it is possible to prevent the incorporation of impurities that have an effect on the properties of a single crystal under pulling into the fused silica crucible during melting.

According to the present invention, the purpose of the carbon electrode is not limited as long as it is used for arc discharge. However, particularly, it is preferable that the carbon electrode be applied to a process that requires a high degree of cleanliness for a fused silica crucible that is an object (product) to be melted, such as, the manufacturing process of a fused silica crucible. Moreover, this is applied to perform arc melting on the object to be melted that is a dielectric material. Specifically, as degrees of cleanliness of the surface of the electrode, the impurity concentrations have to be not higher than the values of 0.2 ppm of Na, 0.2 ppm of K, 0.01 ppm of Li, 0.1 ppm of Fe, 0.2 ppm of Ca, and 0.01 ppm of Cu.

In addition, as such carbon electrodes, the following examples are used. However, the electrodes according to the present invention are not limited to the examples.

The carbon electrode has a columnar shape from the overall view, which is manufactured by a manufacturing method described later using a raw material of which particles are coke or the like, for example, a bonding material of a coal-based pitch coke and coal-tar pitch, for example, a kneaded material obtained by carbonizing coal-based coal-tar pitch. The front end portion thereof is tapered.

The carbon electrode is made of carbon having a bulk density of greater or equal to than 1.80 g/cm$^3$, and a three-point bending strength of greater than or equal to 35 MPa.

The carbon electrode is composed of a carbonaceous raw material and carbide of the bonding material. It is preferable that the maximum particle size of the carbon raw material be less than or equal to 150 μm, and 90% or more of the carbon raw material have particle sizes of less than or equal to 75 μm. The particle sizes of the carbon raw material can be checked by observing the composition of the carbon electrode with a polarization microscope.

The carbon electrode is an isotropic graphite material obtained by a combination of secondary particles made of the carbonaceous raw material and the carbide of the bonding material with the carbide of the bonding material. It is preferable that the maximum particle size of the secondary particles be less than or equal to 500 μm, and 50% or more of the secondary particles have particle sizes in the range of 38 to 500 μm.

In addition, the anisotropy ratio of specific resistance of the carbon electrode is less than or equal to 1.1, and it is preferable that the content of ash contained therein be less than or equal to 5 ppm in order to enhance composition uniformity of the carbon electrode. The specific resistance in this case is in the range of 1,000 to 1,250 Ωμ-cm. In addition, an anisotropy ratio of an extruded material formed by extrusion molding but not by CIP molding is in the range of 1.6 to 2.0.

As the method of manufacturing the carbon electrode, a method of heating and kneading the carbonaceous raw material of which the maximum particle size is or equal to less than 150 μm, and of which 90 wt % or more have particle sizes of less than or equal to 75 μm with the bonding material with a residual carbon rate of 50% or higher, crushing the obtained kneaded material, sifting them such that the maximum particle size is less than or equal to 500 μm and 50 wt % or more thereof have particle sizes in the range of 38 to 500 μm, performing CIP molding on the obtained secondary particles, performing firing thereon, obtaining an isotropic graphite material by graphitizing them at a temperature of 2,900 to 3,100° C., and processing and purifying them, or a method of heating and kneading the carbonaceous raw material of which the maximum particle size is less than or equal to 150 μm, and of which 90 wt % or more have particle sizes of less than or equal to 75 μm with the bonding material with a residual carbon rate of 50% or higher, performing extrusion molding the kneaded material obtained by heating and kneading at a temperature of 130 to 200° C., performing firing thereon to obtain a graphite material graphitized at a temperature of 2,900 to 3,100° C., and processing and purifying them, may be employed.

Here, the obtained graphite material has a porosity of 10%. However, after impregnating a thermosetting resin such as phenolic or furan resin into the pores, performing firing on them in a furnace using a heavy oil burner as a heat source as in the above-mentioned firing operation, processing and molding them, and performing high-purity processing thereon to allow the content of ash to be less than or equal to 5 ppm. In addition, a combination of coal-based pitch coke as the carbonaceous raw material, with coal-based coal-tar pitch as the bonding material may be used.

In addition, as the impurities during the manufacturing process of a fused silica crucible, particularly, Fe incorporated into the single crystal under pulling has a large effect. However, in terms of hardness and strength, many types of cutting instrument contain Fe, so that there is a possibility that they have an effect on degradation in single crystal properties. In the rubbing step of the present invention, the effect of Fe contained in the cutting instrument on the degradation in single crystal properties can be sufficiently reduced to an extent that can be ignored.

According to the present invention, the rubbing material and the object to be melted are vitreous silica powder or vitreous silica. However, the "vitreous silica powder" described herein is not limited to vitreous silica, and may also include a powder made of a material well known as a raw material of the fused silica crucible, such as, crystal and silica sand containing silicon dioxide (silica) and those in a crystal, amorphous, or glass state. In addition, the internal structure thereof is not limited to only vitreous silica.

Accordingly, it is possible to provide an electrode which can perform arc melting by preventing the incorporation of impurities sticking to the surface of the electrode during arc melting into the object to be melted. In addition, it is possible to manufacture a fused silica crucible which has low impurity content and is hardly affected by the impurities during single crystal pulling.

DETAILED DESCRIPTION OF THE INVENTION

Hereinafter, a method of manufacturing a carbon electrode and a method of manufacturing a fused silica crucible according to an embodiment of the present invention will be described with reference to the accompanying drawings.

Figure 1:
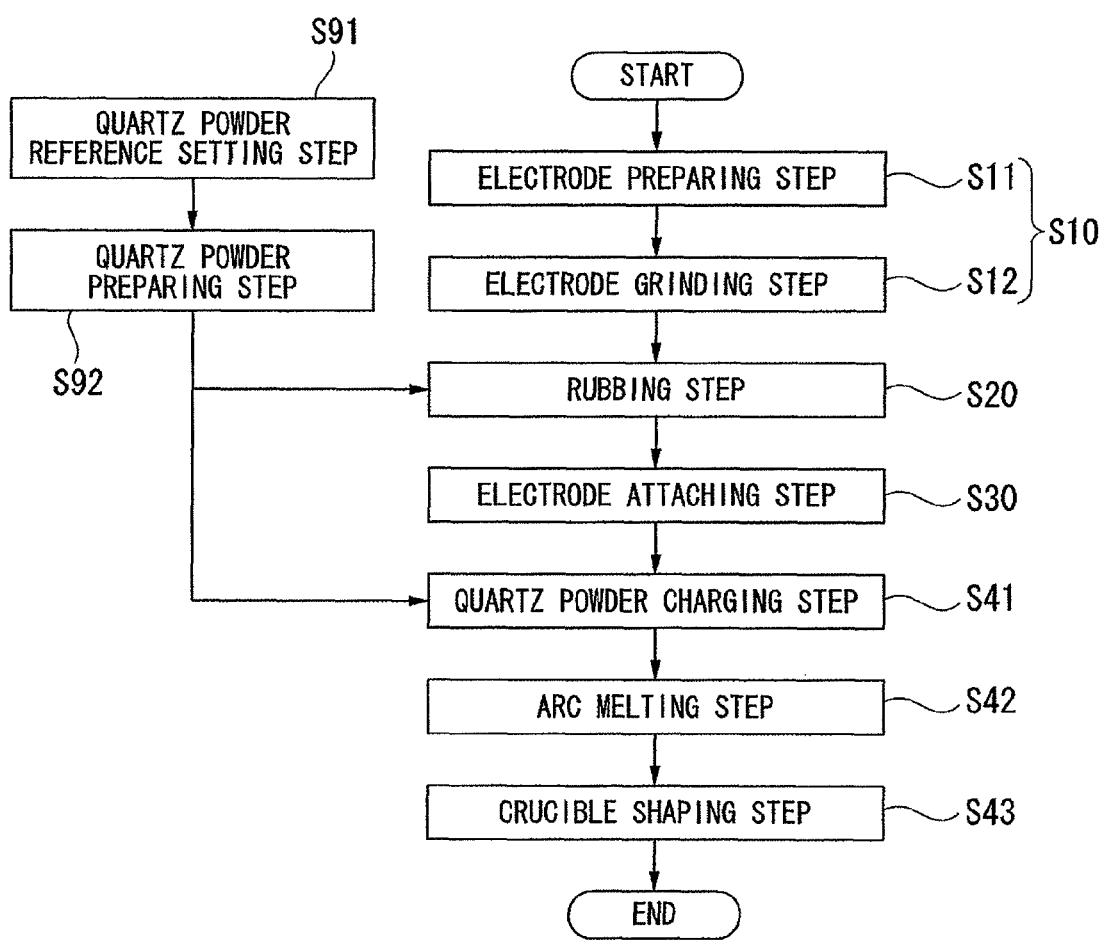
FIG. 1 is a flowchart of a method of manufacturing a carbon electrode and a method of manufacturing a fused silica crucible according to an embodiment of the present invention.
Figure 2:
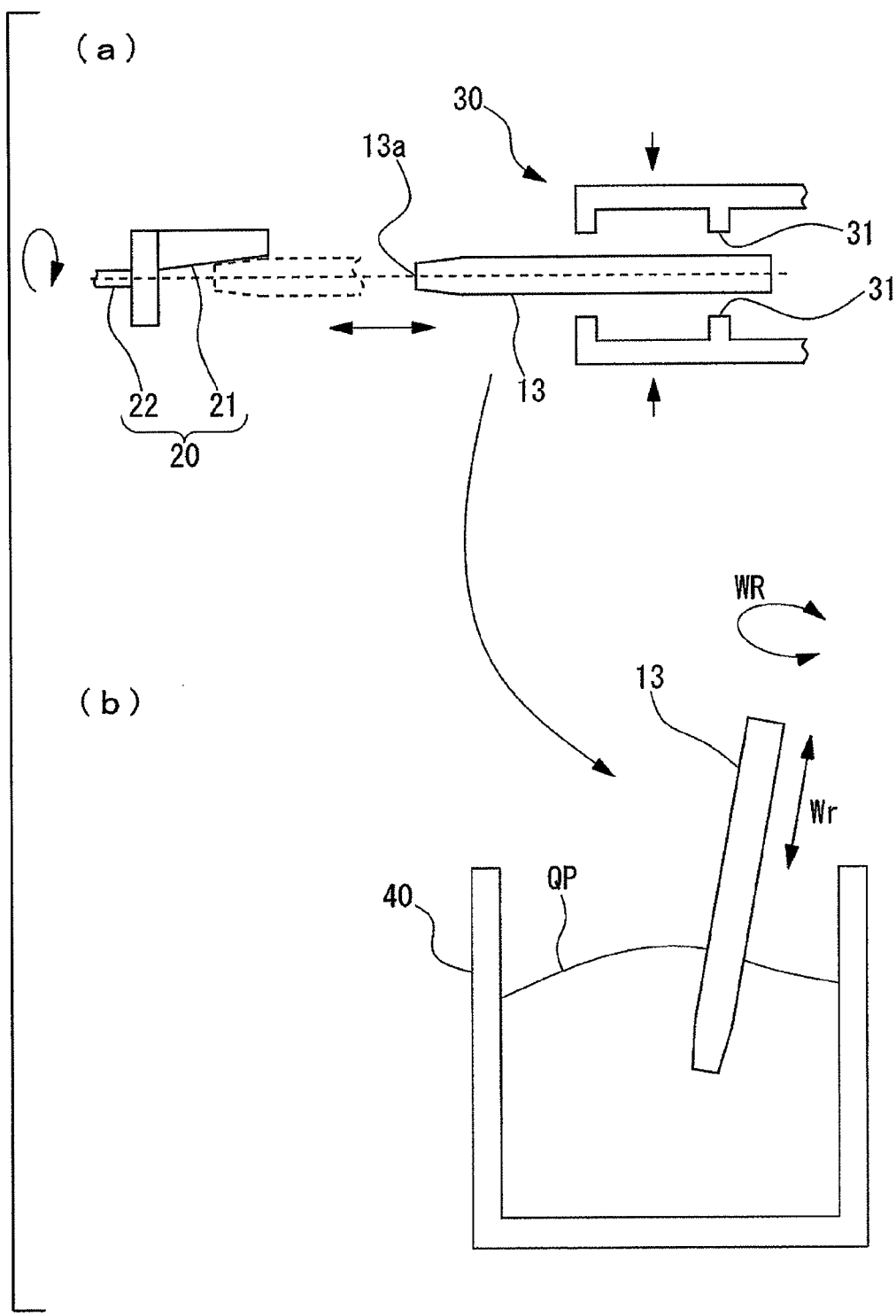
FIG. 2 is a process diagram illustrating the method of manufacturing a carbon electrode according to the embodiment.
Figure 3:
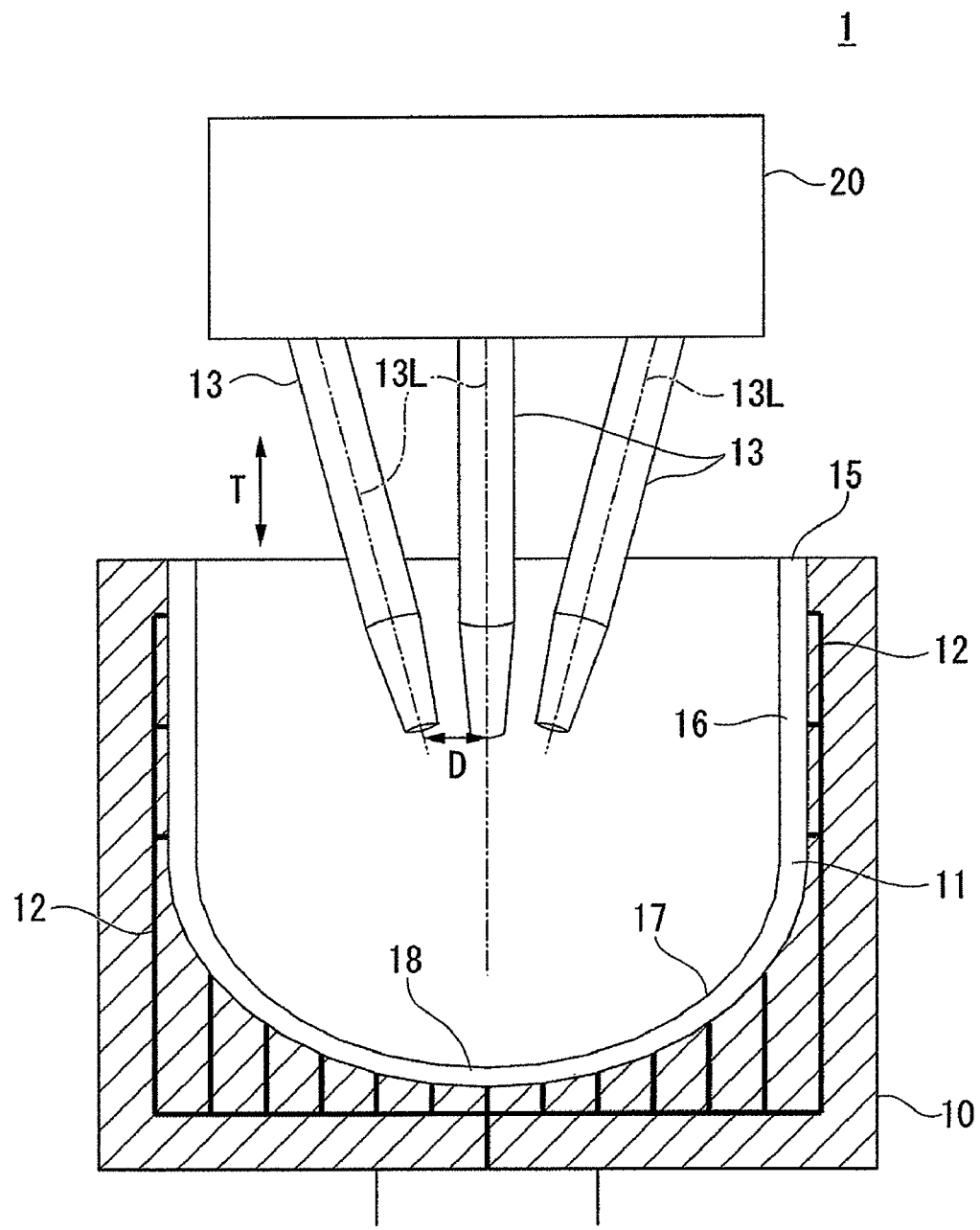
FIG. 3 is a diagram schematically illustrating an apparatus for manufacturing a fused silica crucible.

FIG. 1 is a flowchart of the method of manufacturing a carbon electrode and the method of manufacturing a fused silica crucible according to this embodiment of the present invention. FIG. 2 is a process diagram illustrating the method of manufacturing a carbon electrode according to the embodiment. FIG. 3 is a diagram schematically illustrating an apparatus for manufacturing a fused silica crucible. In the figure, reference numeral 13 denotes a carbon electrode.

The method of manufacturing a carbon electrode and the method of manufacturing a fused silica crucible according to this embodiment include, as illustrated in FIG. 1, an electrode shaping step S10 including an electrode preparing step S11 and an electrode grinding step S12, a rubbing step S20, an electrode attaching step S30, a vitreous silica powder charging step S41, an arc melting step S42, a crucible shaping step S43, a vitreous silica powder reference setting step S91, and a vitreous silica powder preparing step S92.

In the method of manufacturing a carbon electrode and the method of manufacturing a fused silica crucible of this embodiment, the carbon electrode 13 is used for manufacturing a fused silica crucible and provided in an apparatus 1 for manufacturing a fused silica crucible as illustrated in FIG. 3.

The apparatus 1 for manufacturing a fused silica crucible includes, as illustrated in FIG. 3, a mold 10 which can be rotated by a rotating device (not shown) and defines the outer appearance of a fused silica crucible. A raw powder (vitreous silica powder) is charged into the mold 10 with a predetermined thickness so as to become a vitreous silica powder compact 11. Inside the mold 10, a number of air passages 12 which are open to the inner surface and connected to a pressure-reduction device (not shown) are provided to reduce the pressure in the vitreous silica powder compact 11. At an upper position of the mold 10, carbon electrodes 13, 13, and 13 for arc heating, which are connected to a power supply device (not shown), are provided to heat the vitreous silica powder compact 11. The carbon electrodes 13, 13, and 13 can be allowed to move vertically as shown by arrows T and D in the figure by an electrode position setting device 20, and inter-electrode distances D can also be set.

The apparatus 1 for manufacturing a fused silica crucible is a high-output apparatus for heating and melting a non-conductive object (vitreous silica powder) by arc discharge using the plural carbon electrodes 13, 13, and 13 in an output range of 300 to 12,000 kVA.

The carbon electrodes 13, 13, and 13 are electrode bars with the same shape so as to perform, for example, AC three-phase (R-phase, S-phase, and T-phase) arc discharge at a power density of 40 to 900 to 1,700 $kVA/cm^2$, and as illustrated in FIG. 3, the axial lines 13L are provided to form a reverse triangular pyramidal shape with an apex therebelow at an angle of about 8 to 12°, or an angle of about 5 to 15°.

The carbon electrode 13 is made of high-purity carbon particles with a particle size of less than or equal to 0.3 mm, preferably less than or equal to 0.1 mm, and more preferably less than or equal to 0.05 mm, and when the density thereof is in the range of 1.30 to 1.80 $g/cm^3$, or in the range of 1.30 to 1.70 $g/cm^3$, the density difference between the carbon electrodes with the corresponding phases can be allowed to be less than or equal to 0.2 $g/cm^3$. As described above, with the high homogeneity, a generated arc becomes stable, and local deficiencies of the carbon electrode 13 can be prevented.

According to this embodiment, in the electrode preparing step S11 shown in FIG. 1, the carbon electrode 13 is prepared which has a predetermined strength composition as described above and a columnar shape.

Next, in the electrode grinding step S12 shown in FIG. 1, as illustrated in FIG. 2A, a front end portion 13a of the carbon electrode 13 held by a holding device 30 is ground by a grinding device 20 and formed into a shape suitable for arc discharge. In the grinding device 20, for example, a grinding tooth 21 for grinding the carbon electrode 13 is rotated about a rotation shaft 22 that is a rotation axial line in the same direction as the axial line of the carbon electrode 13.

In the electrode grinding step S12, the carbon electrode 13 held by the holding device 30 is moved to and from in the electrode axial line direction to allow the front end portion 13a to be ground and shaped by the grinding tooth 21. In terms of strength of the carbon electrode 13, the grinding tooth 21 applies SUS or the like that contains Fe.

The electrode preparing step S11 and the electrode grinding step S12 constitute the electrode shaping step S10.

Next, in the vitreous silica powder reference setting step S91 shown in FIG. 1, as described later, the type of the vitreous silica powder used for manufacturing a fused silica crucible is specified, and the type of vitreous silica powder used for the rubbing step S20 is specified.

The raw material used for manufacturing a fused silica crucible according to this embodiment, uses synthetic vitreous silica powder and/or natural vitreous silica powder, as the raw powder (vitreous silica powder) charged into the mold 10.

Here, the synthetic vitreous silica powder is made of synthetic vitreous silica, and the synthetic vitreous silica is a raw material which is chemically synthesized and manufactured. Synthetic fused silica powder is amorphous. The raw material of the synthetic vitreous silica is gas or liquid, so that it can be easily refined, and the synthetic vitreous silica powder can be made to have a higher degree of purity than the natural vitreous silica powder. As the raw material of the synthetic fused silica, there are a raw material originating from gas such as carbon tetrachloride and a raw material originating from liquid such as silicon alkoxide. With regard to the synthetic vitreous silica powder glass, it is possible to restrict all impurities to 0.1 ppm or less.

In the synthetic fused silica powder synthesized by a sol-gel process, typically 50 to 100 ppm of silanol produced by hydrolysis of alkoxides remains. In the synthetic fused silica containing carbon tetrachloride as the raw material, silanol can be controlled in a wide range of 0 to 1,000 ppm, and typically about 100 ppm or more of chlorine is contained. In the case of alkoxides as the raw material, a synthetic fused silica that does not contain chlorine can be easily obtained.

The synthetic fused silica powder synthesized by the sol-gel process, as described above, before melting, contains about 50 to 100 ppm of silanol. When this is subjected to vacuum melting, desorption of silanol occurs, and silanol of the obtained fused silica is decreased to about 5 to 30 ppm. In addition, the amount of silanol is different depending on melting conditions such as the melting temperature and an increase in temperature. The amount of silanol in a glass that is obtained by melting the natural vitreous silica powder under the same condition is less than 5 ppm.

In general, it can be said that the synthetic fused silica has lower viscosity than the fused silica obtained by melting the natural vitreous silica powder at a high temperature. One reason is that silanol or halogen cuts a mesh structure of a $SiO_4$ tetrahedron.

The glass obtained by melting the synthetic fused silica powder transmits UV radiation with a wavelength of up to 200 nm when light transmittance is measured, therefore, it is thought that it has properties similar to a synthetic fused silica formed of carbon tetrachloride, as the raw material, which is used for UV optics applications When a fluorescence spectrum is measured by exciting the glass obtained by melting the synthetic fused silica powder with UV radiation with a wavelength of 245 nm, fluorescence peaks such as a melt of the natural vitreous silica powder cannot be seen.

In addition, the natural vitreous silica powder device a powder formed of natural vitreous silica, and the natural vitreous silica is a raw material obtained by digging out rough vitreous silica from the natural environment and performing processes such as breaking and refining thereon, and the natural vitreous silica powder is made of α-vitreous silica crystal. In the natural vitreous silica powder, 1 or more ppm of Al and Ti is contained. Also, metal impurities are in higher levels than those of the synthetic vitreous silica powder. The natural vitreous silica powder hardly contains any silanol. The amount of silanol of glass obtained by melting the natural vitreous silica powder is <5 ppm.

In the case where the light transmittance of the glass obtained from the natural vitreous silica powder is measured, mainly due to Ti contained as impurities at about 1 ppm, at wavelengths less than or equal to 250 nm, the transmittance significantly decreases, and light is hardly transmitted at a wavelength of 200 nm. In addition, around 245 nm, absorption peaks caused by oxygen defects can be observed.

In addition, when a fluorescence spectrum is measured by exciting the melting of the natural vitreous silica powder with UV radiation with a wavelength of 245 nm, fluorescence peaks are observed at wavelengths of 280 nm and 390 nm. The fluorescence peaks are caused by oxygen bond defects in the glass.

By measuring the concentration of contained impurities, measuring a difference between silanol amounts or light transmittance, or measuring the fluorescence spectrum obtained by excitation with UV radiation with a wavelength of 245 nm, whether the glass material is the natural vitreous silica or the synthetic vitreous silica can be determined.

In addition, as the raw powder (vitreous silica powder), the synthetic vitreous silica powder may mainly be used for a transparent layer provided on the inside in a thickness direction, and the natural vitreous silica powder may be used for a bubble layer provided on the outside in the thickness direction.

In addition, in the vitreous silica powder reference setting step S91 of this embodiment, with regard to the vitreous silica powder used in the rubbing step S20, the impurity levels are set to be in the ranges of 0.001 to 1.0 ppm of Fe, 0.001 to 1.3 ppm of Na, 0.001 to 1.0 ppm of K, 0.001 to 1.0 ppm of Li, 0.001 to 0.05 ppm of Cu, and 0.001 to 1.0 ppm of Ca, preferably, in the ranges of 0.001 to 0.35 ppm of Fe, 0.001 to 0.15 ppm of Na, 0.001 to 0.15 ppm of K, and 0.001 to 0.3 ppm of Li, or in ranges at lower levels than the above-mentioned ranges. In addition, the average particle size $D_{50}$ of the vitreous silica powder used in the rubbing step S20 is set to be in the range of φ100 to 250 μm.

As described above, the vitreous silica powder used in the rubbing step S20 which has low impurity levels may be used as the raw vitreous silica powder used for manufacturing a fused silica crucible. At the same time, the powder having the same particle size as that of the raw vitreous silica powder used for manufacturing a fused silica crucible may be used as the vitreous silica powder used in the rubbing step S20. Otherwise, as the powder used for manufacturing a fused silica crucible for pulling a semiconductor single crystal, the levels of the vitreous silica powder used in the rubbing step S20 may be set to the above-mentioned levels.

Next, in the vitreous silica powder preparing step S92 shown in FIG. 1, as the vitreous silica powder set in the vitreous silica powder reference setting step S91, predetermined amounts of vitreous silica powder for a rubbing material and vitreous silica powder for the vitreous silica powder compact 11 that is the raw material of the fused silica crucible are prepared.

Next, in the rubbing step S20 shown in FIG. 1, the surface of the carbon electrode 13 is rubbed by the vitreous silica powder QP as the rubbing material to reduce and remove impurities on the surface of the electrode.

In the rubbing step S20, as illustrated in FIG. 2B, the vitreous silica powder QP is stored in a storage tank 40, and in the state where the side of the front end portion 13a of the carbon electrode 13 is inserted into the storage tank 40, the storage tank 40 and the carbon electrode 13 are rotated and/or reciprocated relative to each other in the axial direction for rubbing.

A relative momentum of the rubbing process is different depending on cleanliness required for a contamination state of the surface of the carbon electrode 13. In the manufacturing process of a fused silica crucible, preferably, 0.5 to 100 rotations and 1 to 200 reciprocations, and more preferably, 5 to 20 rotations and 3 to 10 reciprocations are performed. In addition, in the rubbing step S20, a portion of the carbon electrode 13 which is allowed to come in contact with the vitreous silica powder needs to include, at least, a range from the front end 13a, which is consumed by arc discharge in the arc melting step S42 described later. For example, in a manufacturing process of a crucible with an opening diameter of 40 inches, the portion may be in the range of 50 mm and to 0 mm in the axial direction of the carbon electrode 13, and more preferably, in the range of 20 mm or to 0 mm. Otherwise, a ratio of the axial length of the contact range to the diameter of the carbon electrode may be in the range including 0.001 to 0.9, and in the range of 0.1 to 1.5 to 2.

In the rubbing step S20, during the processing, the carbon electrode 13 is held by the holding device 30 and rotated as shown by an arrow WR in FIG. 2B and reciprocated as shown by an arrow Wr, by a driving device (not shown). In addition, the holding device 30 may have a configuration to perform functions of both setting the position of the carbon electrode 13 with respect to the grinding device 20 in the electrode grinding step S12 and moving the electrode in the rubbing step S20.

In the holding device 30, with regard to at least a contact portion 31 that comes in contact with the carbon electrode 13, the impurity levels of the surface thereof may be set in the ranges of Fe of 0 001 to 1.0 ppm, Na of 0.001 to 1.3 ppm, K of 0.001 to 1.0 ppm, Li of 0.001 to 1.0 ppm, Cu of 0.001 to 0.05 ppm, Ca of 0.001 to 1.0 ppm, preferably in the ranges of Fe of 0.001 to 0.35 ppm, Na of 0.001 to 0.15 ppm, K of 0.001 to 0.15 ppm, and Li of 0.001 to 0.3 ppm, or in the ranges at lower levels than above-mentioned ranges.

For example, in the setting of the impurity levels of the surface of the holding device 30 in the rubbing step S20, rubbing and cleaning the surface of the contact portion 31 of the holding device 30 with the vitreous silica powder used for the rubbing process of the carbon electrode 13 before the rubbing step S20 can be considered.

In addition, in this embodiment, the carbon electrode 13 is rotated and reciprocated by the holding device 30. However, rotating and reciprocating the storage tank 40 by a driving device (not shown) may be employed.

Next, in the electrode attaching step S30 shown in FIG. 1, the carbon electrode 13 is attached to the apparatus 1 for manufacturing a fused silica crucible in a state where the surface cleanliness is maintained.

Next, in the vitreous silica powder charging step S41 shown in FIG. 1, the vitreous silica powder specified in the vitreous silica powder reference setting step S91 and prepared in the vitreous silica powder preparing step S92 is charged into the mold 10 in a predetermined state thereby forming the vitreous silica powder compact 11.

In this state, in the arc melting step S42 shown in FIG. 1, power is supplied to the carbon electrode 13 disposed at a predetermined position to melt the vitreous silica powder compact 11.

After completing the melting, in the crucible shaping step S43 shown in FIG. 1, predetermined operations such as rim cutting and inner surface cleaning are performed, thereby completing the manufacturing process of the fused silica crucible.

In this embodiment, the rubbing step S20 of cleaning the surface of the carbon electrode 13 with the vitreous silica powder QP is included. Therefore, impurities sticking to the surface of the carbon electrode 13 during arc melting are prevented from being incorporated into the fused silica crucible to perform arc melting, so that it is possible to manufacture a fused silica crucible which has low impurity content and is rarely affected by the impurities during pulling of the single crystal.

Figure 4:
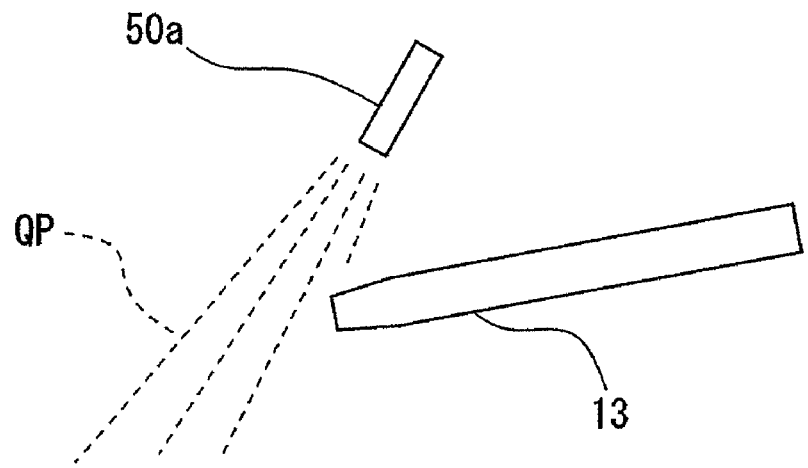
FIG. 4 is a diagram schematically illustrating an embodiment of another rubbing step according to the present invention.

In addition, in the rubbing step S20 of this embodiment, the vitreous silica powder QP is stored in the storage tank 40, and the surface of the carbon electrode 13 is cleaned in the storage tank 40. However, as illustrated in FIG. 4, ejecting the vitreous silica powder QP from a nozzle 50a as a rubbing material so as to rub the carbon electrode 13 and performing surface treatment such as rubbing and cleaning on the surface of the carbon electrode 13 by sandblasting.

Figure 5:
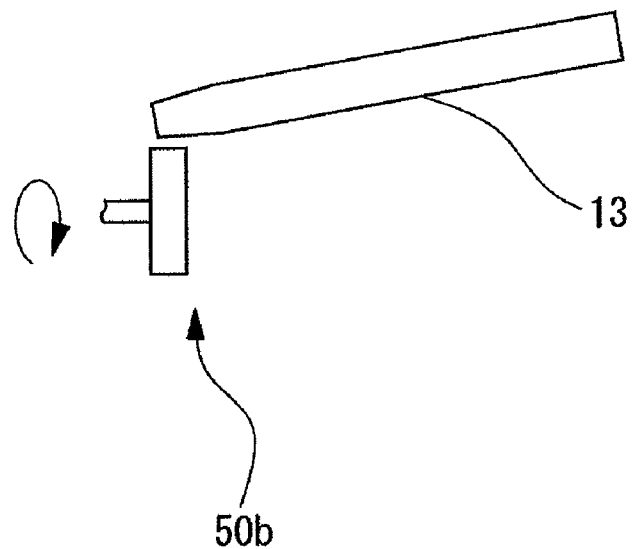
FIG. 5 is a diagram schematically illustrating an embodiment of another rubbing step according to the present invention.

In addition, the rubbing material is not limited to the vitreous silica powder QP as long as it is of the same type with substantially the same degree of cleanliness as the vitreous silica powder that is the raw material of the fused silica crucible that is to be an object to be melted, cleans the carbon electrode 13 by rubbing, and prevents impurities from re-sticking and other contaminations. In addition, as illustrated in FIG. 5, the surface of the carbon electrode 13 may be rubbed by a grinder 50b which is made of vitreous silica with substantially the same degree of cleanliness as the vitreous silica powder that is the raw material of the fused silica crucible that is to be the object to be melted.

In addition, the grinder 50b made of vitreous silica may be used for finishing and shaping in the electrode shaping step S10 so as to simultaneously perform the rubbing step S20 and the electrode shaping step S10.

Figure 6:
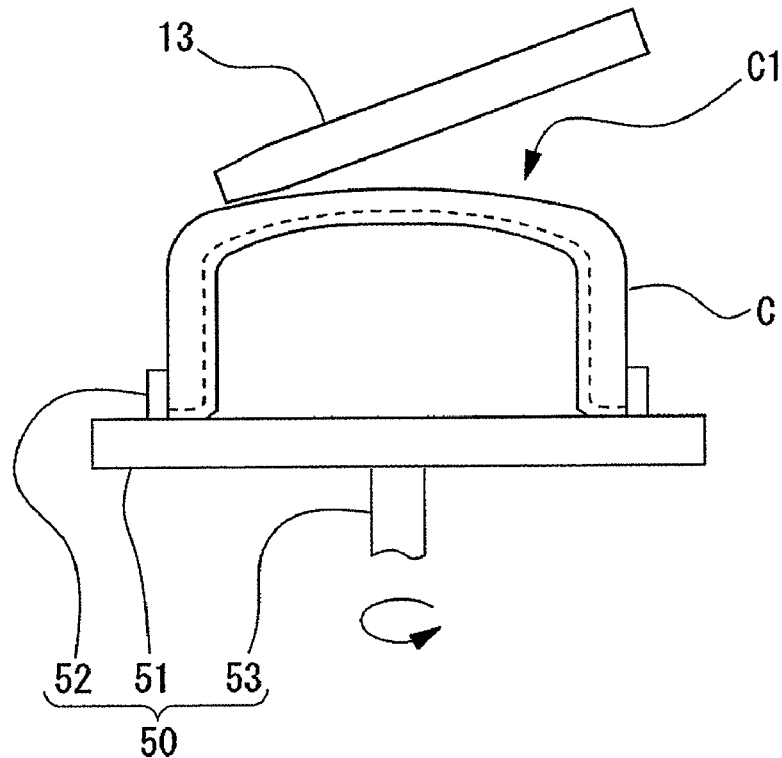
FIG. 6 is a diagram schematically illustrating an embodiment of another rubbing step according to the present invention.
Figure 7:
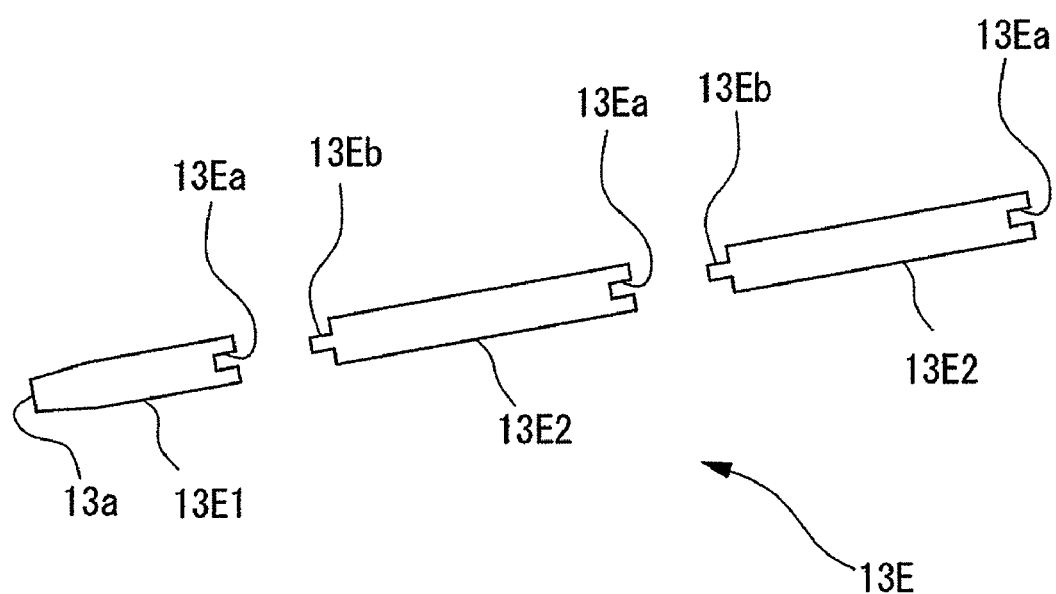
FIG. 7 is a diagram schematically illustrating another carbon electrode according to the present invention.

In addition, as illustrated in FIG. 6, the carbon electrode 13 may be allowed to come in contact with and be rubbed by the outer surface C1 of the fused silica crucible C rotated by a crucible rotating device 50 to perform surface treatment of rubbing and cleaning the surface of the carbon electrode 13. The crucible rotating device 50 may include a placement plate 51 on which the crucible C is placed such that the bottom thereof is disposed upward, a fixing device 52 for fixing the crucible C on the placement plate 51 so as to be attached and detached, and a rotation shaft 53 for rotating the placement plate 51 by a driving device (not shown).

As the fused silica crucible C in this case, crucibles which to be discarded may be employed such as those that do not satisfy the levels specifying the crucible inner surface properties because small graphite particles stick to and contaminate the inner surface of the crucible or the like, and those that are broken in the rim cut process or the like in the crucible shaping step S43. In addition, in the example illustrated in the figure, the entire crucible C is placed on the placement plate 51. However, pieces cut from the crucible C may also be placed on the placement plate 51.

Figure 8A:
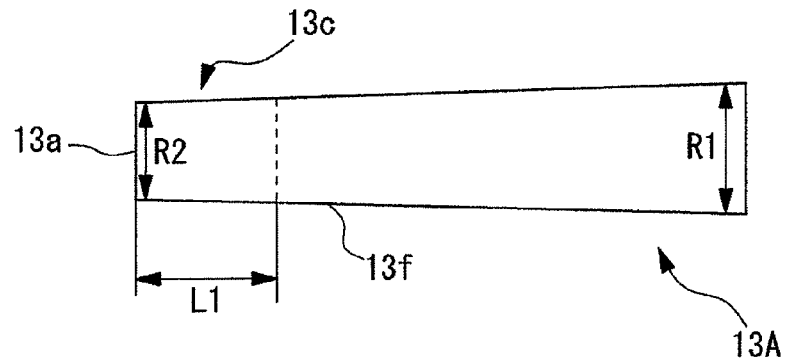
FIG. 8 is a diagram schematically illustrating a carbon electrode front end portion according to another embodiment of the present invention.
Figure 8B:
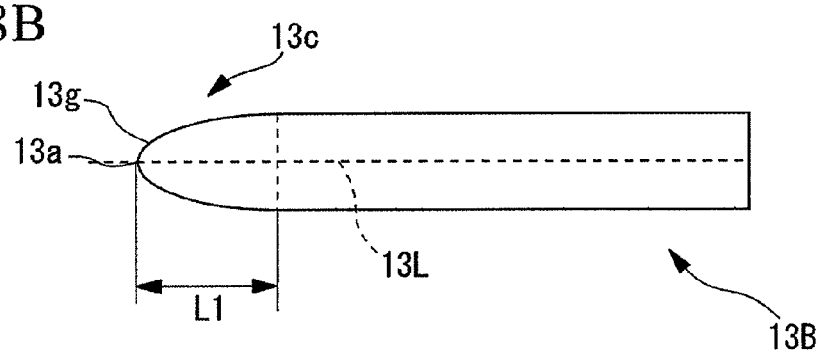
Figure 8C:
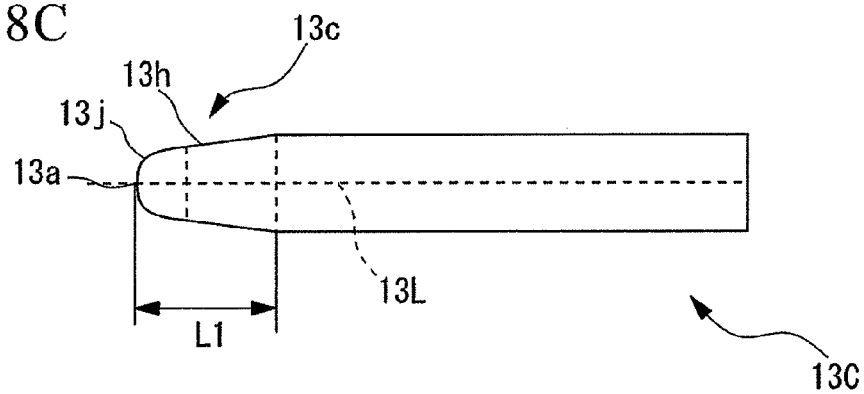
Figure 8D:
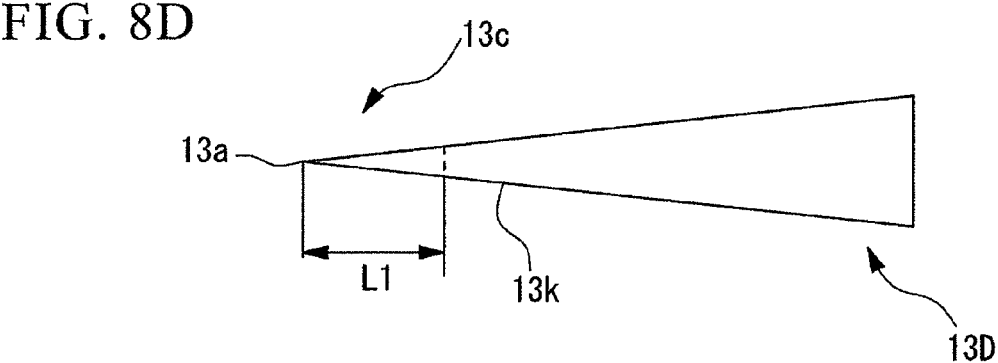

In addition, the carbon electrode may have a configuration in which, as illustrated in FIG. 8A, the diameter of a carbon electrode 13A continuously decreases from a base portion to a front end 13a, the diameter R2 of the front end 13a is set to be smaller than the diameter R1 of the base portion, and a side surface 13f along the entire length is formed as a truncated cone, a configuration in which, as illustrated in FIG. 8B, the shape of a contact portion 13c near a front end 13a of a carbon electrode 13B is a curve shape in which curvature breakpoints do not exist in a cross-sectional outline along the axial line 13L of the carbon electrode 13C, for example, an elliptic arc shape, a configuration in which, as illustrated in FIG. 8C, the shape of a contact portion 13c near a front end 13a of a carbon electrode 13C is a curve shape in which the base portion has a peripheral surface 13h configured as a truncated cone that continues from the uniform diameter portion, a portion at a side of a front end 13a from the truncated cone smoothly continues from the truncated cone, and curvature breakpoints do not exist in a cross-sectional outline along the axial line 13L of the carbon electrode 13, for example, an elliptic arc shape or an arc shape, or a configuration in which, as illustrated in FIG. 8D, the diameter continuously decreases from the base portion of a carbon electrode 13D to a front end 13a into a cone shape.

EXAMPLES

Hereinafter, Examples of the present invention will be described.

Experimental Example 1

As Experimental Example 1 according to the present invention, the impurity concentration of the front end portion 13a of the carbon electrode 13 which was not subjected to the shaping was measured. Here, a predetermined amount of the electrode front end portion was obtained, and the impurity concentration thereof was measured by a flame photometer for performing quantitative analysis using flame reaction, and an ICP-AES for identifying an element or determining a quantity of the element from an emission spectrum emitted when the element that was subjected to atomization and thermal excitation by inductively coupled plasma is returned to a ground state. The results are shown in Table 1.

In the table, the unit represents the number of micrograms of an object to be measured from one gram of a sample.

ground by 10 mm from the surface of the carbon electrode 13 was measured. The result is shown in Table 1.

From Table 1, it can be seen that Experimental Examples 1, 4, 5, 6, 8, 9 were in preferable ranges, and Experimental Examples 2, 3, and 7 were not in preferable ranges.

From the result, even in the case where the impurity concentration inside the electrode was low, impurities stuck to the

TABLE 1

| | Element | | | | | | | | | | | | | | |
|---|---|---|---|---|---|---|---|---|---|---|---|---|---|---|---|
| | Na | K | Li | Al | Ca | Fe | Ti | Zr | Mg | Cr | Cu | Mn | Ni | Zn | Co |
| Analysis | Flame | Flame | Flame | ICP | ICP | ICP | ICP | ICP | ICP | ICP | ICP | ICP | ICP | ICP | ICP |
| Experimental Example 1 | 0.11 | 0.11 | <0.01 | <0.2 | 0.15 | 0.12 | 0.02 | <0.01 | 0.02 | <0.01 | <0.01 | <0.01 | <0.01 | <0.01 | <0.01 |
| Experimental Example 2 | 0.04 | 0.02 | <0.01 | <0.5 | 0.12 | 0.24 | 0.39 | <0.02 | 0.02 | 0.11 | <0.02 | <0.02 | 0.03 | <0.02 | <0.02 |
| Experimental Example 3 | 0.04 | 0.02 | <0.01 | <0.5 | 0.11 | 0.20 | 0.37 | <0.02 | 0.01 | 0.10 | <0.02 | <0.02 | 0.02 | <0.02 | <0.02 |
| Experimental Example 4 | 0.02 | 0.02 | <0.01 | <0.5 | 0.19 | 0.40 | 1.07 | <0.02 | 0.03 | 0.28 | <0.02 | <0.02 | 0.02 | <0.02 | <0.02 |
| Experimental Example 5 | 0.03 | 0.01 | <0.01 | <0.5 | 0.14 | 0.07 | 0.89 | <0.02 | 0.01 | 0.23 | <0.02 | <0.02 | 0.01 | <0.02 | <0.02 |
| Experimental Example 6 | 0.02 | 0.02 | <0.02 | <0.8 | 0.28 | 0.18 | 0.05 | <0.04 | <0.04 | 0.04 | <0.04 | <0.04 | <0.04 | 0.04 | <0.04 |
| Experimental Example 7 | 0.05 | 0.03 | <0.01 | <0.5 | 0.25 | 0.13 | 1.61 | 0.02 | 0.03 | 0.37 | <0.02 | <0.02 | 0.02 | 0.01 | 0.02 |
| Experimental Example 8 | 0.01 | 0.00 | <0.01 | <0.2 | 0.05 | <0.01 | <0.01 | <0.01 | <0.01 | <0.01 | <0.01 | <0.01 | <0.01 | <0.01 | <0.01 |
| Experimental Example 9 | 0.01 | <0.01 | <0.01 | <0.2 | <0.01 | <0.01 | <0.01 | <0.01 | <0.01 | <0.01 | <0.01 | <0.01 | <0.01 | <0.01 | <0.01 | unit(μg/g)

Experimental Examples 2 and 3

Under the same conditions as Experimental Example 1, the impurity concentration of the front end portion 13a of the carbon electrode 13 right after the electrode grinding step S12 was measured. The results are shown in Table 1.

Experimental Examples 4 to 6

Under the same conditions as Experimental Example 1, the impurity concentration of the front end portion 13a of the carbon electrode 13 right after the grinding step S20 was measured. The results are shown in Table 1.

Experimental Example 7

Under the same conditions as Experimental Example 1, the impurity concentration of a portion which comes in contact with a contaminated holding device but not the holding device 31 disposed on the base end side of the carbon electrode 13 right after the electrode grinding step S12 was measured. The result is shown in Table 1.

Experimental Example 8

Under the same conditions as Experimental Example 1, the impurity concentration of the front end portion 13a of another carbon electrode 13 which is not subjected to the shaping but is sealed was measured. The result is shown in Table 1.

Experimental Example 9

Under the same conditions as Experimental Example 1, the impurity concentration of a portion inside the electrode front end portion of the electrode, and this degree decreased in the sealed electrode. However, when the grinding and shaping were performed, the impurity concentration on the surface of the electrode increased. However, it can be seen that by performing the rubbing step of the present invention for surface treatment of the surface of the electrode, the impurities stuck by the grinding step were cleaned, thereby reducing the impurity concentration.

Next, by using those electrodes, a fused silica crucible was manufactured, and a single-crystal silicon was pulled. As a result, it could be seen that although impurities caused from the crucible were incorporated into the single-crystal silicon, the impurity concentration of the surface of the electrode was reduced, and a single-crystal silicon having a low impurity concentration was pulled.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A method of manufacturing a carbon electrode for melting a vitreous silica object to be melted by arc discharge, wherein the levels of impurities of the vitreous silica are set to be in the ranges of 0.001 to 1.0 ppm of Fe, 0.001 to 1.3 ppm of Na, 0.001 to 1.0 ppm of K, 0.001 to 1.0 ppm of Li, 0.001 to 0.05 ppm of Cu, and 0.001 to 1.0 ppm of Ca, or in the ranges at lower levels than these ranges, the method comprising:

rubbing the surface of the carbon electrode before power is supplied, with a vitreous silica of the same type as the vitreous silica object to be melted, by at least one of:

inserting a front end side of the carbon electrode into a storage tank storing powdered vitreous silica, by at least one of rotating and reciprocating in an axial direction the storage tank and the carbon electrode relative to each other;

rubbing the surface of the carbon electrode by ejecting powdered vitreous silica from a nozzle onto the surface of the carbon electrode;

rubbing the surface of the carbon electrode with a grinder made of vitreous silica; and rubbing the surface of the carbon electrode against a rotating surface of at least a portion of a fused vitreous silica crucible.

2. The method according to claim 1, wherein the rubbing step is performed after a grinding step of shaping the front end of the carbon electrode.

3. The method according to claim 1, wherein the average particle size $D_{50}$ of the vitreous silica powder is in the range of 100 to 250 μm.

4. The method according to claim 1, wherein in the rubbing step, when the front end side of the carbon electrode is rubbed, the levels of impurities on the surface of a holding device for holding the base end side of the electrode are maintained in the ranges of 0.001 to 1.0 ppm of Fe, 0.001 to 1.3 ppm of Na, 0.001 to 1.0 ppm of K, 0.001 to 1.0 ppm of Li, 0.001 to 0.05 ppm of Cu, and 0.001 to 1.0 ppm of Ca.

* * * * *